Patented Jan. 12, 1932

1,840,450

UNITED STATES PATENT OFFICE

ALPHONS O. JAEGER AND JOHANN A. BERTSCH, OF ST. LOUIS, MISSOURI; SAID JAEGER ASSIGNOR TO THE SELDEN COMPANY, OF PITTSBURGH, PENNSYLVANIA, A CORPORATION OF DELAWARE

ZEOLITE PRODUCT

No Drawing.   Application filed March 18, 1926.   Serial No. 95,771.

This invention relates to base exchanging bodies or zeolites and derivatives, their preparation and use.

Base exchanging bodies which are usually polysilicates or alumino silicates have been extensively used in the softening and purification of water and also to some extent as catalysts. The structure of zeolites, particularly those prepared by wet methods, is usually opalescent, finely porous and honeycomb like, so that the zeolites are characterized by a ready permeability both for the gases and for liquids. This structure is of great importance not only in purification of liquids, but also in catalyses both liquid and vapor phase.

The present invention has for its object, among others, the introduction into the typical zeolite structure of other bodies which may be present in the form of insoluble or difficultly soluble particles or aggregates or which may form compounds with certain components of the zeolite structure. These added components may be of the most varied nature and among them are included inert diluents, absorptive diluents of highly porous structure which increases the effectiveness of the zeolite as a catalyst or as an absorbent, catalytically activating substances and catalytically active substances. Mixtures of these various types of added components or as we shall refer to them in the specification, diluents, may also be used and are included in the present invention. The zeolites themselves may be inert, catalytically active catalytically activating or they may have both of the latter properties.

The word "zeolite" as used in the present application is intended to cover not only compounds which readily and rapidly exchange their bases but also compounds which have only a weak base exchange power. The term also includes derivatives and transformation products such as dehydration products in so far as these products retain the typical zeolite structure. For many purposes, especially for use as catalysts, zeolite compounds having a relatively weak base exchanging power are the equivalents of compounds which exchange their bases with great readiness and which are commonly referred to as zeolites.

The word "diluent" is used herein to refer to a material foreign to the zeolite in which it is distributed, and which material is in pieces of appreciable size, that is, such as are visible with an ordinary high power microscope, and is to be distinguished from matter which is chemically combined with or molecularly dispersed in or upon the surface of the zeolite.

The introduction of the diluents into the zeolites may take place in various ways and as has been pointed out above, the chemical and physical characteristics of the added diluents may be very different. Thus, the products of the present invention may fall into a number of classes, depending on the nature of formation of the products and also on the nature of both the zeolite component and the diluent component. For simplicity, these different processes of the invention will be listed as follows:

1. The diluents to be embedded in the zeolite structure can be mixed in a solid form either singly or in mixture in one or more of the liquid components of simple or mixed zeolites or suspended in mixtures of such liquids. Thus, for example, kieselguhr may be embedded in a finely divided state in an ordinary sodium aluminum zeolite by suspending the kieselguhr either in the water glass solution or in a sodium aluminate solution or in the mixture after the two solutions have been poured together but before the zeolite has precipitated out in the form of a gelatinous mass. Obviously, of course, part of the diluents may be added to one fluid and part to the other and numerous other combinations are possible, some of which will be illustrated in the specific examples to follow.

2. The diluents which are to be embedded in the zeolite can be introduced into the gelatinous zeolite precipitates by kneading or thorough stirring.

3. The substances to be suspended in the zeolite can be produced in one or more of the liquid components which are used in producing the zeolite. The formation may be by a strictly chemical action or by a mixture of chemical and physical actions. Various precipitates can be used, producing diluents in exceedingly fine division. For example, copper hydroxide may be precipitated in one or other of the solutions used in producing a simple sodium aluminum zeolite. Protective colloids may be added to increase the fineness of division of the suspensoids or to prevent coagulation.

4. Diluents to be embedded in the zeolite can be produced at the same time that the zeolite is formed by introducing the necessary components of the diluent in the form of solutions into separate solutions of the zeolite components so that the diluents are precipitated at the same time that the zeolite is formed. For example, a water glass solution may contain formaldehyde, whereas a platinum chloride solution is introduced into a sodium aluminate solution. When these two components are poured together to form the sodium aluminum zeolite, the platinum is reduced and is distributed throughout the zeolite structure in the form of exceedingly finely divided colloidal platinum. However, in this case, the precipitation must be such as actually to form a diluent, as distinguished from a co-precipitation in which a single complex chemical compound is formed, or in which the several compounds are precipitated in molecular dispersion with one another.

5. Instead of reducing a solution of salt of a reducible metal by means of a reducing agent incorporated in one of the components of the zeolite, the reduction can take place with a coincident oxidation of one of the zeolite components as when, for example, a silver ammonium nitrate solution is mixed with a water glass solution to which is added a solution containing tri or tetravalent vanadium. The silver is reduced to a colloidal metal during the formation of the zeolite and the vanadium is oxidized.

6. A solution of the component to be introduced as a diluent can be mixed with any of the soluble components of the zeolite and after the zeolite has been formed containing a soluble diluent in the form in which it is liable to be washed out, the product can be treated to transform the soluble diluent into an insoluble form. Thus, for example, a permanganate solution may be present in one or other of the components used in forming a sodium chromous zeolite and the zeolite which contains permanganate in soluble form can then be treated with formaldehyde or other reducing agent to transform the permanganate into an insoluble manganese dioxide.

7. Finely divided diluents may be introduced by impregnating artificial or natural zeolites with true or colloidal solutions of the diluents and then drying.

8. The diluents to be embedded can also be introduced into the fine pores and cells of the zeolite structure by impregnation with solutions containing these bodies in soluble form and treating with other solutions which cause a precipitation of the diluents in insoluble form. Thus, a zeolite may be impregnated with soluble nitrate solution and then treated with chromic acid whereupon the insoluble chromate precipitates in very fine division throughout the structure of the zeolite.

9. Zeolites can be impregnated with solutions of the diluents which are then precipitated by subsequent treatment. For example, a zeolite can be impregnated with a zinc nitrate solution and the product brought into contact with ammonia, precipitating out the zinc hydroxide in a finely divided state.

10. Relatively inert porous bodies can be impregnated with the desired diluents and then incorporated in the zeolite in any suitable manner as described above. For example, kieselguhr or charcoal can be impregnated with a potassium vanadate solution and then with a silver nitrate solution, precipitating finely divided silver vanadate throughout the kieselguhr. This treated kieselguhr is then introduced into the zeolite structure by incorporation in one or another of the zeolite component solutions.

Any of the ten methods set out above can be used to introduce a single diluent or a plurality of diluents. One diluent may also be introduced by one of the methods and another by a second and other combinations of procedure will be readily apparent to those skilled in the art.

Zeolites containing diluents in a finely divided form dispersed throughout the zeolite structure may also be subjected to further treatments such as, for example, to treatments with salt solutions in order to exchange part or all of the exchangeable bases of the zeolite for other bases. The zeolite may also be treated with acids or with salts of acids which are capable of forming with the zeolites difficultly soluble salt-like bodies. Both of these subsequent treatments may be combined in a single zeolite in various degrees. For some purposes, where the zeolite and its accompanying diluents are not sufficiently strong mechanically, great strength may be imparted by subsequent treatment with dilute solutions of soluble silicates which effect a partial silicification of the surface of the zeolite.

It should be clearly understood that when diluent bodies are incorporated in a zeolite, they may modify the properties of the zeolite or their own properties may be modified. For example, catalytically active zeolites may contain activating diluents or vice versa. Part of the composite zeolites may be catalytically active and may be activated by a portion of the diluents added, whereas further portions of the diluents may be themselves catalysts which may be activated by a portion of the zeolite. Various similar combinations may, of course, be effected and are intended to be included within the scope of the present invention. It is also possible to incorporate one zeolite into another zeolite in the form of a diluent and this second zeolite may, in turn, contain its own diluents.

In general, the nature of the compounds or elements which can be introduced as diluents is not restricted other than by the conditions set by the use to which the zeolite is to be put. Moreover, the very advantages of the zeolite structure may so modify the characteristics of certain of the embedded diluents as to render them suitable for purposes for which in the uncompounded state they are totally useless. Thus, for example, many compounds of excellent catalytic activity cannot be used as catalysts in reactions which are effected at high temperatures owing to the fact that they tend to sinter and to lose their effective surface. When these same products are embedded throughout the porous, firm, difficultly fusible zeolite structure, they may in some cases be used in reactions which are carried out at temperatures far above the point at which the diluent sinters, but owing to the fact that the diluent is finely divided and dispersed throughout the structure of the zeolite, sintering does not take place. By this means, the present invention opens up new fields of high temperature work for certain catalytic and other processes which have hitherto not been available for the purpose.

The choice of diluent material to be introduced is very wide and is conditioned by the uses to which the zeolite is to be put. A few typical diluents will be described without, however, limiting the invention to the particular products incorporated.

Zeolites to be used for water softening can be advantageously combined with diluents which aid in the purification and softening of the water. For example, finely divided kieselguhrs of all kinds, particularly natural or artifically treated celites, fullers earth, talc, pulverized zeolites of natural or artificial origin, tufas, trass, lava and other volcanic rocks, green sand, glauconite, slag wool, pulverized slag, cements, silica gel, quartz filter stones, pulverized earthenware, manganese dioxide, pulverized carbon such as various kinds of coke, charcoal, artificial carbon, soot, humus carbon, animal charcoal, sugar charcoal, etc. These diluents may be of various particle sizes but the best results are produced by very finely divided diluents. The fineness of division appears to have a decided effect on the homogeneity with which the diluent and the zeolite are combined. The effect of the large surface energy of finely divided diluents which increases the adsorption and diffusion speed and also the porosity, is of great importance and aids largely in the purification of water. A particle size less than 60 microns is very suitable and increases the adsorptive power of the final product to a very considerable extent. Such bodies give remarkable results in the purification of water, permitting not only a very rapid softening of water, but at the same time clearing it and removing organic components which frequently give the water an undesirable color or taste. Zeolites containing finely divided porous diluents may also be regenerated in a much shorter period than undiluted zeolites.

Catalytically active zeolites can be combined with a very large number of diluents such as, for example, the diluent bodies described in paragraph 1 and which are effective mainly due to their physical structure which permits an increase in the absorptive and adsorptive power of the product and also its permeability. Bodies which are themselves catalytically active in the particular reaction for which the zeolite is to be used or bodies which are catalytic activators may also be used. In some cases, it is very desirable to incorporate diluent materials which have a catalytic power different from that of the zeolite itself. Thus, for example, in certain reactions such as reduction of oxygen containing compounds, the reaction may be a combined reduction and dehydration and two types of catalysts may, therefore, be used for the best result. These two types can be very effectively combined into a homogeneous unit by embedding in zeolites which are reduction catalysts diluent bodies which are dehydration catalysts or vice versa. In a similar manner, other combinations may be effectively utilized in other composite catalytic reactions to bring about an increase in efficiency of the reaction and reliability of the catalysts.

In some catalytic reactions it is desirable to use catalysts of opposite catalytic powers such as combinations of oxidation and reduction catalysts and the like and such composite catalysts can be readily prepared by means of the present invention. The different types of catalysts can be present as part of the zeolite, as part of the diluents or partly in the zeolite and partly in the diluents. By this means very accurately tuned or damped catalysts can be produced which are important in many sensitive reactions.

It should be understood that it is difficult to draw a line between the diluents which are catalytically inactive and those which are catalytically active or which are activators. Thus, some diluents which have a large surface energy may be chemically indifferent in a particular reaction in which they are to be used, but due to their enormous surface energy, they may increase the concentration of reacting materials at particular points and thus bring higher concentrations of reacting compositions into contact with the actual catalyst particles. The present invention is in no sense limited to any particular type of diluent or to the use of a single type of diluent in a single zeolite. On the contrary, various mixtures of diluents of different characteristics may be incorporated in a single zeolite, either simultaneously or successively and sometimes such mixed catalysts show a most remarkable and unexpected activity. Frequently, mixed diluents embedded in catalytically active zeolites may very largely increase the permissible loading to which the zeolite may be subjected. The possibility of incorporating a large number of catalytically active diluents of various catalytic powers into a homogeneous structure is also of importance in many reactions which are very sensitive and which require catalysts that are closely tuned to the particular reaction. This usually means that no single catalytic element will be satisfactory and a mixture or blending of individual catalysts is necessary. The present invention constitutes a very simple and efficient method of bringing about such mixtures in a single homogeneous structure which possesses many advantages from the standpoint of mechanical strength and catalytic efficiency.

Many reactions require that catalysts be diluted or damped in order to prevent the reaction from proceeding too far. This is particularly true in many organic oxidations which tend to burn up the products unless the catalysts are very closely tuned and their strength adjusted to the particular reaction. Another great difficulty lies in the fact that many catalytic reactions are strongly exothermic and tend to produce very high reaction heats in certain portions of the catalysts with resulting uncertainty of control of the reaction and in many cases rapid disintegration of the catalyst.

The present invention is eminently suited for the production of catalysts to be used in reactions which tend to become uncontrollable. Thus, the catalytic element which may be present either in the zeolite or as part of the diluent material added may be diluted to any desired extent with inert or practically inert bodies, such as, for example, powdered glass, pumice meal, asbestos, slag, wool, graphite, powders of indifferent metals, powdered silicates, charcoal, and the like. Not only can the diluents be very accurately controlled and evenly distributed throughout the whole of the catalyst structure, avoiding an uneven distribution of the catalyst and consequent formation of hot spots during reaction, but the zeolite structure itself contributes an important characteristic to the catalyst which is to be used in strongly exothermic or sensitive reactions. The zeolite structure while combining a very high porosity and permeability with even distribution, also possess the very important advantage which has been touched on above, that it does not tend to sinter at elevated temperatures and even where local overheating may take place, in certain exothermic reactions, the great resistance of the zeolite catalyst to sintering at elevated temperatures renders it peculiarly useful. The homogeneous structure of the zeolite catalyst also has the important advantage that the catalytic particles themselves, whether diluents or particles of the zeolite molecule, are connected intimately with a large amount of relatively indifferent material so that the tendency of the catalyst particles to overheat is combated by the relatively rapid radiation of heat through the whole structure. The ease with which cheap, indifferent materials may be used as diluents without affecting the desirable physical and chemical characteristics of the catalyst constitutes an added advantage of the present invention and may effect a very large saving in expensive chemicals in many reactions.

The remarkable efficiency of the diluted zeolite catalysts of the present invention when used in strongly exothermic and delicate reactions is quite surprising and we are not sure just why the zeolite catalysts are so efficient since the complexity of the reactions which take place during catalyses and the almost total impossibility of taking accurate observations of what goes on at the catalytic surface itself, makes it impossible to determine what the true reason is. Without, however, limiting the invention in any way to a theory of action of the catalysts, we are of the opinion that probably one of the most important, if not the most important reason for the efficiency of the catalyst lies in the peculiar structure of the zeolite framework which keeps the individual catalytic particles apart and thus prevents undue concentration of catalysts in any one point and correspondingly prevents the formation of hot spots. The distribution of heat evolved over the whole surface of the contact mass results in a milder reaction and prevents it going too far. The effects of the diluted zeolite structure should not be confused with mere mechanical mixtures of catalysts with inert materials which distribute the heat evolved over a larger surface, but which do not affect the activity of the individual catalyst particles and hence do not prevent undesirable side reactions which appear to be prevented in many cases when the catalysts are incorporated into the zeolite structure.

Diluents which are themselves activators for catalysts already present in the molecules of the zeolites or embedded therein must, of course, be chosen with a view to efficiency in the particular catalytic reaction for which the zeolite is to be used. Activators may owe their power either to their physical structure or to their chemical composition or to both and in some cases it is difficult to determine which factor predominates. No distinction will therefore be made in principle between physical activators and chemical activators.

In general, all materials having a particle size less than 60 microns are good positive activators and in most cases the activating power is to be attributed to their physical structure. Examples of such physical activators are finely ground quartz powder or pulverized minerals rich in quartz, pumice meal and the like. Kieselghur and finely divided silica are also excellent activators and it is probable that their activating power is not wholly due to their finely porous physical structure. Chemical activators include, for example, radio active materials, certain pulverized metals or metal alloys and pulverized zeolites, and other compounds or minerals containing elements which are either themselves activators or if not activating per se become activators when incorporated into materials of certain physical structures, such as for example, zeolites. In the case of some zeolites chemical changes within the zeolite structure itself may give to the product activating powers.

In many cases it is difficult to draw a sharp line between substances which are activators and substances which are catalysts. Little is known about the actual manner in which the particular substances act and in many cases a substance which is not a catalyst or but a poor catalyst, may be an excellent activator for another catalyst. In the present invention we do not wish to define the term "activators" in terms of any chemical theory and in the specification and claims, the word "activators" will be used to cover such materials which do not give good yields in catalytic reactions when used alone and which, in some cases, may give no yields at all but which, when combined with other catalysts, either simple catalysts or zeolite bodies, result in a distinct catalytic reaction with a considerable increase in quantitative yield or purity of product or both. In the sense used above many metal oxides, hydroxides, carbonates, sulfates, difficultly soluble halides, nitrates, silicates, tungstates, uranates, chromates, vanadates, mangenates, ferrates, molybdates, aluminates, plumbates, hydrated oxides of the alkaline earth metals and other earth metals, and in general all compounds of activating elements difficultly soluble or insoluble in water or alkalies, are included as activators. In addition to the metal oxides and salts referred to above many metallides, hydrides, carbides, silicides, sulfides, sulfites, nitrides and organic compounds of the activators, preferably compounds which are insoluble in water and alkalies, may be used as activators. Ammonium or cyanogen complexes of the activators may also be used. Of course, the choice of particular activators depends on the catalytic reaction in which they are to be used and naturally some compounds which are activators for one reaction may not be activators for another. Activated catalysts of the present invention in which the activator forms a portion of the catalyst framework are not to be confused with mixtures of the activator and the particular catalytic element since the peculiar structure which makes them true novel compounds or compositions, produces an effect which is frequently very much greater than the sum of the effects of the two components. The peculiar physical structure of the zeolite which permits an even and very homogeneous product of high porosity brings about a cooperation between the activators and the catalysts which is not possible where the two are merely mixed.

Catalytically active diluents which may be incorporated into zeolites of the present invention may be catalytically active by reason of their physical structure such as, for example, surface catalysts, or they may possess catalytic power by reason of their chemical composition or in many cases their catalytic power is dependent both on their physical structure and on their chemical composition. Surface catalysts which owe their catalytic power to a large extent to their high porosity or fineness of subdivision with correspondingly large exposed surfaces, are very numerous and only a few will be mentioned, such as kieselguhr, silica gel, activated charcoal, highly porous carbons or charcoals of various types, pulverized earthenware, pulverized unglazed porcelain, very porous hydroxides or hydrated oxides of the alkaline earth metals and earth metals and porous and voluminous bodies such as hydrated aluminum oxide which can be prepared under particular conditions of precipitation. Zeolites in pulverized form may also be classed as surface or physical catalysts and the same can be said of many colloidal metals or metal oxides.

While the diluents, inactive, activating or catalytically active, and the zeolite body itself have been spoken of as if they were separate entities, it should be remembered that the products of the present invention are not in any sense mixtures and on the contrary, the diluents are so embedded and incorporated into the very structure of the zeolite, that their effectiveness is very largely increased and the products of the present invention are to be considered as novel products and in no sense as mixtures. The results which can be obtained from the composite zeolite catalysts of the present invention are frequently very different from the results obtainable by means of the catalytic component alone or by mixtures of the catalyst and zeolites.

Chemical catalysts which primarily depend on their chemical constitution for their catalytic power are, of course, very numerous and can be used as embedded diluents preferably in the form of almost any of their water insoluble or alkali insoluble compounds. In general, practically all of the catalytically active elements can be incorporated into zeolites of the present invention as catalytically active diluents and the invention is in no sense limited to the particular catalytically active diluents which will be described in greater detail in some of the following specific examples.

Composite zeolites of the present invention can be of various types in which the zeolite itself may be catalytically active, inactive or activating and in the same way diluents may be catalytically active, inactive or activating. Where the zeolite is itself catalytically inactive it nevertheless provides the actual catalysts with a rigid framework of high porosity, mechanical strength and maximum permeability for gases and liquids. It will be readily seen that various combinations of zeolites and diluents of different catalytic properties or activating properties can be used and open up a wide field of composite catalysts of high frequency.

The zeolite structure, providing, as it does, rigid framework for the diluent bodies and making possible an exceedingly fine and even division of these diluents throughout the whole mass greatly increases the adsorptive and absorptive power of the product as a whole and what is perhaps, more important, the relatively high fusing point of the zeolite prevents sintering of catalysts which may be embedded in it, especially when the zeolite is used in exothermic reactions. This advantage opens up a new field of catalysts which contain catalytic elements of low fusibility, which elements have hitherto been inapplicable for certain reactions, owing to the fact that they tend to sinter and recrystallize with a loss of effective surface and in many cases with a very great loss of mechanical strength. Zeolite catalysts, on the other hand, which contain these low melting catalysts embedded in the zeolite framework, practically eliminate the tendency to recrystallization and very largely prevent sintering. The resultant resistance to high temperatures and uniformly long effective life constitutes a distinct contribution to the field of catalysts of low fusing points.

The zeolites of the present invention which contain embedded catalysts are also of great value in certain reduction catalyses where the catalysts usually used have undesirable and frequently dangerous pyrophoric properties. We have made the surprising and important discovery that zeolite catalysts of the present invention containing pyrophoric reduction catalysts embedded in their structure, are themselves practically free from pyrophoric power and although this disadvantage of the uncombined reduction catalyst is substantially completely removed, it is effected without any undesirable loss in catalytic efficiency so that it is not necessary to compromise safety for higher efficiency.

The present invention is particularly advantageous in the case of pulverulent catalytic bodies which in ordinary use raise very serious problems in the choice of a proper cementing means. The zeolite structure holds such catalysts firmly and rigidly and at the same time in an even and exceedingly finely divided state. Moreover, the zeolites which, when first made are relatively plastic, can be formed into any desired shape and because of their high permeability, can be used in the form of plates which are mechanically firm and greatly simplify the problems of converter structure and of converter charging. The zeolite plates can be provided with almost any desired reinforcing means, such as, for example, wire mesh which can be rolled into the plate before it is formed. Heating or cooling elements can be introduced into the catalyst plate while still plastic and form a very advantageous combination where sensitive catalytic reactions are to be carried out. Needless to say, the heating and cooling tubes can be so arranged as to form valuable reinforcements for the catalyst plate and thus greatly improve its mechanical strength and rigidity and simplify the mounting of the catalyst in converters.

The zeolites during formation or immediately after formation are frequently sufficiently fluid so that they can be used to coat the inner walls of converters or converter units and when thus applied they solidify to form a rigid even coating on the converter walls, which coating not only prevents undesirable side reactions but at the same time, with a proper choice of zeolite, can be made to gradually increase the catalytic efficiency of the converter as a whole.

The diluted zeolites of the present invention may also be coated on massive metal or other carriers to form contact masses of various desirable shapes and heat transfer capacities. The coating may be by application of a solution or suspension of the diluted zeolite to the carrier or may be by means of various adhesives or cements in which case the diluted zeolite may be employed in the form of a fine powder. Other coating methods may also be used.

A further advantage of zeolites as cementing or carrying media for catalytic diluents lies in the fact that these zeolites are for the most part only weakly alkaline and hence undesirable side reactions such as, for example, condensations which are easily effected by strongly alkaline binders such as water glass, soda, potash and the like, are avoided, thus making available the zeolites of the present invention for many reactions for which catalysts cemented with strongly alkaline cements are entirely unsuitable or give rise to considerable difficulties in operation.

Another advantage of the zeolite structure lies in the fact that when the zeolite is combined with catalytic diluents in a nascent state, the composite precipitate, after suitable stirring, is granular and readily filterable and this is true even when the catalysts themselves form slimy difficultly filterable precipitates. Zeolites containing pulverized catalysts to be used in liquid phase reaction such as, for example, hydrogenations, are in many cases far superior to the catalysts themselves which, when used alone, tend to form colloidal solutions which are difficult to remove from the reaction products and constitute undesirable impurities. When incorporated into zeolitic masses, however, they are readily filterable and liquid products of high purity can be easily obtained.

Zeolites of the present invention, containing catalytically active diluents or activating diluents also open up many possibilities in the field of accurately proportioned composite contact masses. The proportion and the type of simple or composite zeolites and embedded catalysts can be varied within wide limits and a very minute and accurate adjustment of catalytic power and correspondingly of the half-equilibrium period of the catalytic reactions to be carried out with the zeolites, may be obtained. At the same time the catalytic power of the products can be damped or modified so that the activity of the composite catalyst can be sharply limited and intermediate reaction products produced with a maximum yield and with a minimum of impurities.

Catalysts which are embedded in zeolites of the present invention are frequently chemically combined at their surfaces with the zeolite structure itself, producing a kind of silicification and firmly and inseparably uniting the embedded catalysts with the framework of the zeolite itself. The solubility of the catalyst particularly in the presence of weakly acid reagents, is very greatly reduced by their incorporation into the zeolite structure and the production of impurities in reaction products in liquid phase, due to solution of catalytic components, is largely prevented. At the same time, the zeolite structure itself and, if desired, other highly porous diluents which can be incorporated in conjunction, confers on the final product an enormous absorptive power and correspondingly increases the capillarity of the catalyst. Strongly absorptive or adsorptive bodies tend to produce higher concentrations of gaseous or liquid components on or adjacent to their surfaces, and in this manner gases and liquids can be brought into contact with the catalysts embedded in the zeolite structure in high concentrations which make for good yields at high reaction speeds.

The catalytically active diluents may of course, be embedded in zeolites which are themselves catalysts and all that has been described above in connection with catalytically active diluents, applies, of course, with equal force to catalytically active zeolites containing the diluents. The products of the present invention, in which catalytically active diluents are embedded in catalytically active zeolites open up an important new field of composite catalysts. Not only are the catalytic elements of the zeolite molecule and those of the diluent bodies united in a particularly intimate and homogeneous admixture in a mechanically strong, porous framework, but the present invention opens up the possibilities of homogeneous admixture of catalytic elements which have hitherto been available only in purely mechanical mixtures, which, as has been pointed out above, are in most cases far less desirable. Thus, many catalysts cannot be combined together by coprecipitation or by other methods which produce a composite precipitate owing to the fact that the catalysts may be chemically so related as to make their combined precipitation impossible. Where, therefore, mixtures are attempted one catalyst may easily become coated with an impervious layer of another catalyst and the resulting composite products are frequently of low value owing to the fact that the different catalytic components are not all equally available and the admixture is frequently non-homogeneous. When, however, one catalyst is incorporated into a zeolite molecule, either by introduction into the nucleus of the zeolite molecule or by base exchange, another catalyst can be incorporated in the form of a diluent body which is embedded in the zeolite structure. The proportioning can be very accurately controlled and the zeolite structure with its highly porous, permeable, mechanically strong and relatively infusible framework enhances the efficiency of all of the catalytic elements incorporated into it and makes new composite catalysts of great efficiency available. It is a further advantage of the composite zeolite catalysts that they do not tend to dust or crumble and thus one of the serious problems in many catalyses is eliminated from the very beginning.

The incorporation of a plurality of catalysts in a single zeolite structure, whether by means of a plurality of different catalytically active diluents or by the introduction of one or more catalysts into the zeolite molecule itself combined with other catalysts introduced as diluents, permits the production of composite catalysts of the most varying type and with an accurate proportioning of components. Thus, composite catalysts can be prepared for reductions, hydrations, dehydrations, hydrogenations, dehydrogenations, oxidations, condensations, polymerizations, depolymerizations, halogenations, hydrolyses and the like. Composite catalysts containing two or more different types of catalysts are also valuable in many cases and can be produced in a peculiar efficient and simple manner by means of the present invention. Thus, for example, many dehydrogenation and reduction processes involve the splitting off of water and no single catalyst will give the best results, it being necessary to use both a catalyst for the particular reaction and also a catalyst which favors this splitting off of water. Hitherto it has been usually necessary to mix these different types of catalysts mechanically or to use alternating layers. By means of the present invention catalysts of different types can be incorporated into the zeolite structure producing an ideally homogeneous composite catalyst of high efficiency and desirable physical characteristics. The different types of catalysts can be introduced in different forms or in the same form, thus, for example, in the case of a composite reduction-dehydration catalyst the reduction catalyst may be in the zeolite molecule itself and the dehydration introduced as a diluent or vice versa, or both, may be present as diluents or in the zeolite molecule. Other combinations are possible and are included in the invention which has the advantage of a very wide choice of methods of incorporation and of products.

In addition to the common types of catalysts referred to above special catalysts or reactive components may be incorporated, either in the zeolite molecule or as diluents, thus, for example, bodies which remove catalyst poisons from gases can be incorporated into a zeolite structure. In a similar manner catlysts for the formation of water gas, for the synthesis of ammonia, for the synthesis of hydrocyanic acid from carbon monoxide and ammonia, catalysts for the cracking of petroleum and other products and other special ingredients can be incorporated into zeolites of the present invention and are included therein. In all cases, whether with a single type of catalyst or with composite catalysts of varying types, the desired quantitative and qualitative proportions necessary for an accurate tuning or adjustment of the catalyst for its particular reaction can be simply and easily effected by the processes of the present invention.

Another type of composite catalyst which is possible under the present invention consists in catalysts in which either the zeolite or the diluent or both contain substances which are capable of removing catalyst poisons from gases while the zeolite or diluents or both may contain catalysts for particular reaction. Some very durable catalysts can be produced in this manner and can be utilized with gases or liquids which have been purified but little if at all and which would be entirely unsuited for use with ordinary catalysts.

The zeolite products of the present invention which have been described above have been treated as products having diluents and nuclei including the elements, catalytic or otherwise, which were desired. The invention is, however, in no sense limited to such products and on the contrary, any and all of the zeolites containing diluents embedded in their structure may be further treated by means of base exchange to produce a further series of novel products in which the customary alkali metal exchange bases may be partly or wholly substituted. Among the bases which can be introduced by base exchange are the following: lithium, sodium, potassium, copper, rubidium, caesium, silver, gold, beryllium, magnesium, calcium, zinc, strontium, cadmium, barium, mercury, radium, aluminum, scandium, gallium, yttrium, indium, ytterbium, thallium, titanium, zirconium, tin, antimony, thorium, vanadium, arsenic, niobium, tantalum bismuth, chromium, molybdenum, tellurium, tungsten, uranium, manganese, iron, cobalt, nickel, ruthenium, rhodium, palladium, osmium, iridium, platinum, hafnium, ammonium.

The bases may be introduced singly or in mixtures of two or more bases and the introduction may take place simultaneously or successively or in part simultaneously and in part successively. In addition to the bases outlined above complex ions containing one or more of the atoms listed may also be introduced by base exchange and the invention, of course, includes the introduction of one or more different complex ions or of complex ions in combination with simple ions. The possibilities for the variation and production of products having exactly the characteristics for any particular purpose is therefore, a wide one, and it constitutes one of the features of the present invention that the advantages of the zeolite structure can be utilized in connection with so many widely variant combinations of active elements.

We have referred briefly to zeolites which are themselves catalytically active and also to the introduction of catalytically active bases into the nucleus of the zeolite molecule. This introduction enables the zeolite chemist to incorporate in non-exchangeable form in the zeolite nucleus, a large and varied number of chemical elements or complex groups which have desirable catalytic or other properties. We have also found that in many cases, particularly when dealing with certain catalytic elements, the introduction of these elements or their compounds or complexes into the nucleus of the zeolite molecule confers upon the product an activity which is very much greater in many cases and sometimes quite different from that which is shown by the element or base alone, and the compound is also different in its action from zeolites which contain the same base element or complex in an exchangeable form. Among the elements which may be introduced into the nucleus of the zeolites are a number of elements which form more or less amphoteric compounds of various valences. Examples of elements which can be introduced in the form of simple or complex ions singly or in combination are the following: copper, silver, gold, bismuth, beryllium, zinc, cadmium, boron, aluminum, rare earths, titanium, zirconium, tin, lead, thorium, niobium, antimony, tantalum, chromium, molybdenum, tellurium, tungsten, uranium, vanadium, manganese, iron, nickel, cobalt, osmium, arsenic. These elements may be introduced in the form of metallates or as acid or neutral salts or as complex ions of various types.

The acid group of the zeolite nucleus which is ordinarily composed of silicic acid may also be varied by the introduction of other acid groups replacing in whole or in part the $SiO_2$ group. These acids which may be introduced may have various desirable chemical or physical properties and particularly many of them are strong catalysts or catalytic activators or insectides. Among the acids which may be introduced are acids of phosphorus, sulfur, nitrogen, tin, titanium, tungsten, chromium, niobium, tantalum, uranium, molybdenum, arsenic, antimony, manganese and vanadium. The $SiO_2$ component of the zeolite, and any acidic group which wholly or partially replaces it in the zeolite structure, we shall refer to herein as "a nuclear acid component".

A still further series of zeolite products can be formed by treating the finished zeolite with acids or compounds of acids which are capable of forming with the zeolite, and presumably with the exchangeable bases of the zeolite, compounds preferably insoluble or difficultly soluble compounds. A still further group is thus added and of course widens the possible field of novel zeolite products to a great extent. The acid radicals introduced and which are generally present in an ionized form may be of the most varied nature and may particularly be of catalytic insecticidal or activating properties. Some acids are also of advantage in the formation of zeolites to be used for gas purification. It is probable that the acids form with the exchange bases of the zeolite a salt-like body since the compound is ionized and also behaves in a different manner than the complex compounds which are present in the nucleus of the zeolite molecule itself. These combinations with acids present a possibility of introducing a still larger and more varied assortment of catalytic elements in a single product which is of great importance in the production of the certain composite catalysts of high efficiency. The combination with acid radicals does not appear to affect the physical structure of the zeolites and therefore all the advantages which are inherent in this physical structure are retained. Acid groups containing one or more of the following elements: vanadium, tungsten, uranium, chromium, molybdenum, manganese, tantalum, niobium, antimony, selenium, tellurium, arsenic, phosphorus titanium, bismuth, aluminum, lead, tin, zinc, sulfur, chlorine, platinum, boron, zirconium, thorium may be introduced singly or in combination. Corresponding polyacids and complex anions containing these acidic groups may also be combined with the zeolite molecule. Thus, for example, complex anions such as ferro- and ferricyanogen, sulpho-cyanogen, metalcyanogen and ammonia complexes may be introduced. The choice is not limited to anions which form insoluble or difficultly soluble compounds with the exchange bases of the zeolite but we have found that anions which do form difficultly soluble or insoluble compounds with the exchange zeolite bases are preferable for most purposes. With the large choice of exchange bases which can be introduced, however, it is possible in nearly all cases to choose such bases as will form relatively insoluble compounds with a particular complex anion which is to be introduced. The acid groups may be introduced singly or in combination, either simultaneously or successively and the quantitative proportions can be accurately regulated in order to produce products having any desired degree of alkalinity or acidity.

It is, of course, clear that the choice of diluents, exchangeable bases, non-exchangeable bases, nuclear acids and acids which form salt-like compounds must be chosen both qualitatively and quantitatively with due regard for the particular uses to which the zeolite product is to be put. There is a tremendous number of possible combinations in which not only can groups of different chemical activity be introduced in different forms into the zeolite structure but in the case of zeolites which are to be used as catalysts the elements introduced may and frequently do affect each other. Thus, for example, certain exchangeable bases which of themselves possess but little catalytic power, may greatly activate and increase the efficiency of zeolites containing catalysts in non-exchangeable form. The number of possible combinations being so large it is, of course, impossible within the reasonable confines of a single patent specification, to enumerate all of them or even all of the types and only a few typical composite zeolites will be described in the examples which are to follow. It should be of course, understood that the invention is not limited thereby, and many other combinations which may be important in particular cases are included.

In the above discussion the zeolite framework has been treated for the most part as a purely physical skeleton to which the various catalytic elements are attached. While it is probable that this function of a mechanically strong, infusible, porous and permeable frame work constitutes one of the greatest advantages of composite zeolites of the present invention, this is not necessarily true in all cases and sometimes the zeolite composition appears to act as a positive activator and it should be understood that the invention is in no sense to be considered as limited to compounds in which all of the active ingredients are introduced into the zeolite and the latter acts merely as a carrier. On the contrary, both owing to its physical and to its chemical characteristics, the zeolite structure may be of the greatest assistance in activating or rendering more efficient elements, whether catalytic or otherwise, which may be incorporated therein.

The highly porous, permeable and yet with all mechanically firm and relatively infusible zeolite structure, forms an ideal framework and absorbent for the purification of gases and for their absorption and separation. Many of the zeolite types referred to above and many of the diluents can be effectively used. In addition finely divided metals and metal oxides or sub-oxides, for example, boron, platinum, palladium, nickel, cobalt, calcium, tellurium, rhodium, radium, osmium, iridium, magnesium, silver, aluminum, chromium, manganese, vanadium, molybdenum, tungsten and uranium may be used. The oxides of the last six elements are oxidizing agents. Colloidal metals, metal oxides, hydroxides or carbonates such as iron, silver, zinc, lead, manganese and chromium and alkaline earth metals, are particularly useful in the removing of sulfur in all forms from gases containing it. These products can of course, be mixed with other diluents and in many cases this results in important advantages. In some cases diluents which are good absorbers are valuable both for the purpose of actually absorbing gases, liquids or solids where the zeolites are used as an absorbent or purifier and catalytic or other reactions. Among the absorbents carbons of all kinds such as animal charcoal, wood charcoal, coke, hard coals, anthracite, peat, substances rich in humus, peat coke and coke from other substances rich in humus activated carbons of all kinds, silica gel, kieselguhr, cellulose, wool, cotton, wood flour, pulverized earthenware and the like are very effective for many purposes. The choice of course, will depend on the use to which the zeolite is put, those substances, for example such as cellulose, cotton and the like, which will not withstand high temperatures should only be incorporated in zeolites which are to be used at low temperatures. The absorbent diluent can be impregnated with catalysts or activators or they may be introduced into the zeolite in intimate admixtures with finely divided catalysts or activators. The purifying power of the highly absorbent diluents is not prevented in any way by the zeolite structure and in many cases is actually enhanced. It should be understood of course, that the adsorptive capacity or absorptive capacity of diluents is useful not only when working with gases but also in the liquid phase and for the removal of solids, particularly colloidal solids from gases or liquids. When liquid phase absorption at low temperatures is desired certain special diluents such as soap-like bodies, tannins, saponines, and protective colloids of all kinds may be used. It should not be forgotten that the honeycomb-like porous structure of the zeolite itself is a very effective absorbent and cooperates in a peculiarly effective manner with adsorbent or absorbent diluents.

The invention has been described more particularly in connection with diluents which are incorporated into the structure of the zeolite in such a way that the diluents form the disperse phase, whereas the zeolite itself forms the dispersing agent. Many of the most important products of the present invention are of this nature but the invention is not to be considered as limited to products in which the diluent is present as the disperse phase. On the contrary, it is possible and in some cases desirable to produce composite zeolites in which the diluent is the dispersing medium and the zeolite the disperse phase. For example, zeolites can be formed in, or freshly formed zeolites can be introduced into, highly porous crystalline minerals or solid amorphous bodies of honeycomb, sponge, or foam-like structure. For example, pumice, kieselguhr, lava and other eruptive rocks, asbestos, unglazed porcelain, fragments of earthenware, all kinds of porous carbons, such as artificial carbon, activated animal charcoal, humus charcoal, lignite cokes, can be impregnated with the components of the zeolites or the zeolites can be introduced into the porous bodies by kneading or pressing preferably after a preliminary evacuation of the porous body in order to remove air from the pores. In this manner many desirable catalysts can be produced, as it is possible to impregnate a relatively small amount of the zeolite in a large mass of porous material and frequently the products thus produced show as high a volumetric efficiency as does the concentrated catalyst before impregnation. This opens the way to marked reductions in the amounts of catalysts required and since some of the catalytically active zeolites contain very expensive elements important savings can be effected in many cases. Another desirable characteristic of zeolites impregnated into porous material lies in the fact that it is thus possible to damp or moderate the activity of certain catalytically active zeolites in order to prevent too violent reaction in certain catalyses, particularly of organic material, where the reaction is very sensitive and exceedingly active control is necessary. This opens up many improvements in strongly exothermic catalytic reactions, particularly in organic chemistry.

In general, it should be noted that the production of zeolites containing other materials can be effected with widely varying proportions of the raw materials. The character of the zeolite can also vary, thus zeolites of the alumino silicate or of the aluminum double silicate type can be produced. The nature of the zeolite will depend of course, on the use to which it is to be put, thus for example, where a rapid base exchange is desired as when zeolites to be used for the purification of water and for water softening in general, zeolites of the alumino-silicate type will be chosen.

In preparing composite zeolites of the present invention it is usually desirable to use dilute solutions of the raw materials. The invention is, however, not limited to this method of procedure and on the contrary, concentrated solutions may be used and in some cases are very desirable, for example, where catalysts are to be produced. The precipitation of the components can be accelerated in any of the usual ways, for example, by heating, stirring or by the addition of organic or inorganic acids in the liquid or gaseous state. Examples of such acids are hydrochloric acid, sulfuric acid, carbonic acid, nitric acid, acetic acid, formic acid and the like, acid salts, ammonium salts, alkali metal salts, halogens, alcohols and other organic substances such as phenol, creosote, formaldehyde, chloral hydrate and other compounds can be used. In many cases it is also advantageous to work under pressure in autoclaves.

Increased porosity which is desirable in many cases may be brought about by introducing into the composite products soluble, volatile or combustible fillers of organic or inorganic nature which can then be removed, leaving behind pores which still further increase the porosity of the zeolite structure. Zeolites of the present invention, after washing out undesired products partly or completely are preferably dried at temperatures below 100° although this is not necessary in all cases. Where the final products are not sufficiently strong mechanically or where it is desired to vary the proportion of alkali and $SiO_2$ in the zeolite the product should be washed with dilute water glass solution instead of water. This prevents leaching out of excess alkali to a large extent and also effects a surface silification which greatly increases the mechanical strength of the product and is very effective in preventing dusting or crumbling.

Many of the zeolites of the present invention, particularly those which are to be used in catalyses can advantageously be subjected to treatments before or during the catalytic process with oxidizing, reducing or acid agents in gaseous or liquid form, in the cold or at elevated temperatures with or without pressure. As a result the surface of the zeolite will undergo secondary chemical changes and it should be understood that such products are included in the present invention, and where the word "zeolite" is used in the claims, this term is not intended to be limited in any way to zeolites which have completely unchanged surfaces and on the contrary, it includes such products which have suffered secondary chemical changes, particularly on the surface, either by a deliberate preliminary treatment or as a result of the catalytic reaction in which they are used.

The invention will be described in greater detail in the following specific examples which illustrate a few of the many possible combinations which are included in the present invention. The products of these examples and the method by which they are made are to be considered as illustrations of typical products and processes and in no sense limit the invention to the particular products or to the particular procedural steps therein set forth. The products and processes in some of the specific examples however, are of particular importance for certain purposes and while the invention is not limited by these examples, it should be understood that the details of the examples are included as features in the narrower and more specific aspects of the present invention and are in no sense to be considered as immaterial.

*Example 1*

500 parts finely ground pumice meal is impregnated with 10 parts of copper nitrate in solution and is then treated with a dilute alkali solution to precipitate finely divided copper hydroxide in the pumice meal. The mixture is then diluted with 4–6 mols of sodium water glass diluted with sufficient water and stirred into a suspension. 1 mol of aluminum nitrate in the form of a solution is poured into the mixture in a thin stream with vigorous agitation. A sodium aluminum double silicate precipitates out in which the copper impregnated pumice is present in a very finely and evenly divided state. The precipitate is pressed, moderately washed and dried at 80–100° C. and then broken into fragments.

The fragments are reduced with gases containing hydrogen at 250–300° C. and an excellent contact mass results which can be used for the reduction of nitro compounds by hydrogen or hydrogen-containing gases to the corresponding amines. The contact mass is characterized by the fact that it is non-pyrophoric and does not tend to dust. For example, nitro benzol can be cleanly reduced to aniline at 180–260° C. with an almost theoretical yield. In a similar manner nitronaphthalene can be reduced to naphthylamine at 300–350° C. The same catalyst can also be used for dehydrogenating cyclohexanol and its homologues to cyclohexanon and homologues at 280–320° C. The catalyst may also be used to transform borneol into camphor at 280–300° C. and to reduce aldehydes such as acetaldehyde and crotonaldehyde into the corresponding alcohols at 80–180° C. Methane can also be chlorinated at 200–400° C. by means of the same catalyst, giving excellent yields at commercially practical reaction velocities.

The contact mass before or after reduction can be used to purify crude benzol, toluol, xylol, etc. in the liquid phase by permitting the hydrocarbons to trickle over the catalyst in counter-flow to a diluted chlorine gas mixture. The treatment can advantageously take place in a trickle tower at ordinary temperatures or moderately elevated temperatures. The products on fractional distillation yield aromatic hydrocarbons which are free from thiophenes, saturated and unsaturated aliphatic compounds and carbon disulfide.

In this example, the material introduced into the silicate is the catalyst, whereas the silicate itself is an activator and also a dehydrating catalyst.

Example 2

3–5 mols $SiO_2$ in the form of sodium water glass are diluted with 8–10 volumes of water and kieselguhr or silica gel in stirred in until the suspension remains just stirrable. 5.5–5.7 mols of caustic soda are dissolved in water and 1 mol of freshly precipitated aluminum hydroxide is stirred in. A clear solution is formed to which a 5–10% solution of nickel nitrate is added in a thin stream with thorough stirring until 1 mol of nickel hydroxide in sodium alminate is precipitated, then poured into the water glass silicic acid suspension with vigorous agitation. The mixture is warmed to 60–70° C. and if the mass does not gelatinize promptly dilute nitric acid can be added in small portions or carbon dioxide can be passed through the mixture. The firm gel which forms is pressed, moderately washed out and dried, whereupon the mass is broken into fragments. If the fragments are not sufficiently strong to resist pressure they can be washed with a 5% water glass solution and again dried, producing granules which show high mechanical strength and are gas permeable.

The products are sodium aluminum zeolites, contain nickel and kieselguhr or silica gel in the framework of the zeolite. The nickel acts both as a reduction and hydrogenation catalyst, while the kieselguhr and silica gel act as stabilizers and both are distributed in an exceedingly even homogeneous mass. The product as a whole, has a weak dehydrating action due to the aluminum content of the zeolite and the sodium present also activates the contact mass for catalytic reductions and hydrogenations.

The contact mass may be used for hydrogenations and reductions in liquid or gas phase, either in a finely granular condition or in the form of fragments, and is preferably given a preliminary reduction with hydrogen or hydrogen containing gases at 300° C. The product can be used in many processes, such as hardening of oils, reduction of liquid phenols, ketones, nitro compounds and unsaturated hydrocarbons under pressure. During the reaction the phenols are transformed into cyclohexanols, the ketones into secondary alcohols, the nitro compounds into amines and the hydrocarbons into saturated compounds. The catalyst is of general usefulness for the nuclear hydrogenation of aromatic compounds. Liquid phase hydrogenations can also be carried out by causing the liquid compounds to trickle over the catalyst at an elevated temperature in the presence of hydrogen.

The catalyst can also be used for hydrogenations and reductions in the vapor phase by means of hydrogen or hydrogen containing gases. Thus, acetone and other ketones can be transformed into the corresponding secondary alcohols such as isopropyl alcohol, crotonaldehyde to normal butyl alcohol, acetaldehyde to ethyl alcohol, phenol and its homologues to the corresponding cyclohexanols, benzol to cyclohexane, naphthaline to tetraline and decaline, and the like. The hydrogenations with this catalyst proceed with great ease and without interruption. The catalysts possess an unusually long continued effective life and are also capable of carrying a very heavy load.

Example 3

1. 10 mols of $SiO_2$ in the form of sodium or potassium water glass are diluted with 20 volumes of water.

2. 1 mol of $Cr_2O_3$ is dissolved in the form of sodium chromite.

3. 1 mol of vanadyl sulfate is dissolved in water in the form of potassium vanadite.

4. 4 mols of $SiO_2$ in the form of water glass are stirred with ½ mol of permanganate solution and a sugar solution is added until the permanganate is reduced to $MnO_2$. The mixture is stirred and sufficient dilute acetic acid is added drop by drop to produce a weakly acid reaction to litmus. The dark brown gel which precipitates out is added to solution 1 with violent agitation.

Activated carbon is stirred into solution #1, which carbon has received a preliminary treatment by impregnation with sodium phosphate and has been blown with ammonia at 300° C. The solutions and suspensions are then poured together in any desired sequence and if necessary, the mixture is heated to 70–80° C. and ammonium carbonate added to salt out the zeolite which is formed. The precipitated mass is pressed, washed with ammonium carbonate solution and then given a very short water wash. The product is an ammonium-sodium-chrome-vanadyl zeolite in which both silicic acid and manganese dioxide are present together with carbon which has been impregnated with phosphate. All of the zeolite components are present in a very fine and even division in the zeolite structure itself.

The mass is dried, broken into fragments and is an excellent absorbent for removing heavy hydrocarbons and volatile metallic organic compounds from gases and mixtures of gases, particularly in the presence of small amounts of halogen and oxygen. Sulfur compounds of all kinds, both organic and inorganic and other impurities are either directly absorbed or if oxidizing or halogenating gases or liquids are present they are thoroughly decomposed and are transformed into easily removable compounds.

*Example 4*

12–16 mols of $SiO_2$ in the form of a water glass solution are diluted with 30 volumes of water and finely powdered iron oxide is stirred in to render the suspension just stirrable. Preferably the iron oxide is prepared by blowing glowing iron with a stream of oxygen and grinding the oxide scale in a ball mill. The following solutions are poured into the water glass iron oxide suspension with moderate heating: ½ mol potassium tungstate, ½ mol potassium molybdate, ½ mol potassium vanadate, ½ mol potassium aluminate. Carbon dioxide is then passed in to the mixture at 60–80° or small portions of dilute nitric acid are added until the mixture solidifies to a gel. The gel is pressed, dried and washed with ammonia water. The product is a zeolite containing tungsten, molybdenum, vanadium and aluminum in non-exchangeable form and also containing iron oxide in a very finely and evenly divided form distributed throughout the zeolite.

The zeolite is treated by causing a cerium nitrate solution to trickle over it to effect base exchange, dried and reduced with hydrogen at 300–400° C. The resulting product is an excellent catalyst for the synthetic production of ammonia from hydrogen and nitrogen under very high pressures.

*Example 5*

1. 20 parts of powdered siderite pulverized and thoroughly mixed with 4 parts titanium dioxide powder. 24 parts of kieselguhr are impregnated with a 5% copper nitrate solution and dried and the impregnated kieselguhr is then thoroughly mixed with siderite-$TiO_2$ mixture.

2. 36 parts of water glass at 39° Bé. are diluted with an equal volume of water.

3. 2 parts of chromium in the form of chrome nitrate solution and 9.5 parts of aluminum in the form of aluminum nitrate are treated with sufficient caustic soda so that the hydroxides which are first precipitated are again dissolved. Solutions 2 and 3 are mixed together and immediately, while they are still liquid, they are impregnated into the pulverulent mixture 1.

The impregnated mass is formed into granules and dried in an atmosphere of carbon dioxide and calcined. It constitutes an excellent contact for the water gas process of transforming carbon monoxide and water into carbon dioxide and hydrogen. In the contact mass the sodium-chrome-aluminum zeolite in a nascent state acts as a cementing material for the siderite-$TiO_2$-kieselguhr-copper oxide-mixture and because of its chemical composition it behaves as an activator in the process. Carbon dioxide which is given off from the siderite during the process at the reaction temperature of about 500° C. effects a still further vigorous loosening of the constituents of the contact mass and accordingly increases its efficiency.

*Example 6*

1. 165–200 parts kieselguhr are impregnated with a concentrated solution of chromic acid and are reduced in a stream of hydrogen at 300° C.

2. 1 mol of zinc in the form of zinc nitrate is dissolved up to form potassium zincate using a minimum of caustic potash and 0.25 mol of lead nitrate, is similarly dissolved up in caustic potash in the form of potassium plumbite and is mixed with the zincate solution.

3. 4.5 mols of water glass are stirred with 10% by weight of cadmium chromate and mixed with the kieselguhr mixture, #1, to form a suspension.

The mixed solutions #2 are stirred into the suspension #3 with gentle warming and if necessary, dilute nitric acid is added to accelerate the formation of a gel. The gelatinous precipitate which comes down consists in a potassium-zinc-lead-zeolite in which the kieselguhr impregnated with chromium and the cadmium chromate are embodied in a very fine state of division. The precipitate is pressed, dried and a solution of equal parts of cerium nitrate and manganese nitrate are permitted to trickle over it at an elevated temperature in order to exchange the alkali metal of the zeolite for a mixture of cerium and manganese, the treatment being carried on until the base exchange is as complete as possible. The product is then impregnated with an amount of ammonium vanadate solution corresponding to the cerium and manganese introduced in order to form a salt-like combination with the cerium and manganese of the zeolite.

The product described above is treated with a mixture of CO and hydrogen at 300–400° C. at a high pressure and after the catalyst is reduced a rapid formation of methyl alcohol sets in. If the base exchange and the subsequent treatment with the vanadate are omitted the catalyst, when subjected to the action of a carbon monoxide hydrogen mixture at 300–400° C. yields higher alcohols and ketones in addition to liquid reaction products containing methyl alcohol, particularly when the gas mixture is very rich in CO.

Example 7

11–13 mols $SiO_2$ in the form of potassium water glass diluted with 7–10 volumes of water and made slightly ammoniacal. 250 parts of very finely powdered pure zincspar are then stirred into the solution. 2 mols of copper in the form of 5% cuprammonium nitrate solution and 1 mol of potassium chromite solution are then added to the suspension and the mixture stirred and warmed in order to form a gel which is then pressed. If gelatinization does not take place readily dilute nitric acid may be added. The mass is dried in the usual manner and is then given an intensive treatment with a magnesium nitrate solution. The final product is a magnesium-chrome-copper zeolite in which the zincspar is embedded in the framework of the zeolite. On reduction with hydrogen containing gases at 200° C. the product is transformed into an excellent catalyst for the production of methyl alcohol from carbon dioxide and hydrogen at 230–380° C. at an elevated pressure. If desired a circulating process may be employed.

Example 8

1 mol of chromium in the form of potassium or sodium chromite solution is added to 3 mols of caustic potash and 1 mol of iron in the form of a nitrate solution is permitted to run in, producing iron oxide in the chromite solution in the form of a very fine suspension. 4–6 mols of $SiO_2$ of diluted water glass solution is then stirred into the suspension and an alkali chrome zeolite is produced diluted with iron oxide. If desired the alkali metal of the zeolite can be replaced partly or wholly by alkaline earth metals. The alkali metal-alkaline earth metal-chrome zeolite containing embedded iron oxide is then reduced with hydrogen containing gases at 300° C. and constitutes an excellent reduction catalyst which can be used for the reduction of CO especially purified water gas at high pressure at 300–400° C. Liquid reduction products are produced which are, for the most part, higher hydrocarbons of petroleum-like nature and form an excellent fuel.

Example 9

1 mol of freshly precipitated ortho-titanic acid and 15 mols of $SiO_2$ as a sodium silicate solution are mixed together and sufficient pyrolusite is added to produce a suspension which remains just readily stirrable. 1 mol of zinc, 1 mol of chrome and 1 mol of aluminum in the form of the hydroxide are dissolved up in caustic soda and 2 mols of caustic soda are added in excess, whereupon 1 mol of copper nitrate solution is added to produce a suspension of copper hydroxide in the solution of the metallates. This suspension is then stirred into the pyrolusite-water glass-itani cacid suspension and warmed until a gel is precipitated which consists in an alkali aluminum-zinc-chrome-silicic acid-titanic acid-zeolite which contains copper oxide and pyrolusite and some titanic acid embedded in its structural framework. The product can be reduced at 300° C. and is an excellent catalyst for the cracking of high molecular oils.

Example 10

8–10 mols of $SiO_2$ in the form of water glass solution are stirred with ½ mol of sodium tungstate solution and ½ mol of sodium molybdate solution and about 1 mol of pulverized titanium dioxide is suspended in the zeolites. 1 mol of aluminum in the form of an aluminate, 1 mol of $V_2O_4$ as a vanadite and 0.5 mol of chromium as a chromite are dissolved in a caustic potash solution and an excess of about 4–5 mols of caustic potash is added. 1 mol of thorium nitrate is then added to the solution to produce therein a suspension of thorium oxide. The second suspension is added to the first with vigorous stirring and a composite zeolite is produced in the usual manner, using some acetic acid if necessary to accelerate the precipitation. The product is an alkali-aluminum-vanadyl-chrome-$SiO_2$-tungstic acid-molybdic acid zeolite containing titanium dioxide and thorium dioxide in a very fine state of division in its structure. The alkali metal may be exchanged for rare earth metals or manganese.

The catalyst is an excellent one for the synthesis of hydrocyanic acid from ammonia and carbon monoxide, the efficiency being considerably higher when the alkali metal content of the catalyst has been exchanged for other groups. Even better yields of hydrocyanic acid can be obtained when the product formed in Example 5 is finely ground and stirred into the above described zeolite during its formation, thus producing a composite contact mass containing a different zeolite body, as a catalyst embedded and intimately mixed with the main zeolite.

Example 11

200 parts of zinc dust are stirred into 4–5 mols of $SiO_2$ in the form of a potassium water glass solution and 1 mol of a zincate solution is rapidly poured in with vigorous stirring. 45 parts of a calcined magnesia are then added, the mixture warmed and acetic acid added until the potassium zinc zeolite diluted with zinc dust is precipitated out. The product is pressed, dried and impregnated with a thorium nitrate solution, again dried and treated with a dilute potash or water glass solution.

The final product is then broken into fragments and is an excellent catalyst for aldolizations and crotonizations. For example, if acetalydehyde vapors are slowly passed over the catalyst at an elevated temperature an excellent yield of aldol and crotonaldehyde is obtained.

Example 12

85 parts of a pulverized natural zeolite such as nephelin or leucite are formed into a slurry with a dilute sodium vanadate solution containing 14 parts of $V_2O_5$. 21.4 parts of iron sulphate dissolved in water and gradually added, producing a grayish brown voluminous precipitate which is neutralized and treated with 140 parts of concentrated water glass solution. 12.2 parts of chromium oxide are then dissolved in the form of a chromite and mixed with the suspension with vigorous agitation. The mixture is heated to 50–60° and a little dilute sulfuric acid is added to help precipitate out a gelatinous mass which is an alkali chrome zeolite in which large amounts of natural zeolite and iron vanadate are embedded. The product is pressed, dried and treated at 400–500° C. with burner gases. In a short time an excellent contact sulfuric acid process starts up, giving fine yields of $SO_3$.

Example 13

300 parts of freshly precipitated iron oxide are suspended in a large amount of water to which 15 parts of bismuth chloride are added with vigorous stirring. The hydrolysis of the bismuth chloride can be accelerated by the addition of some ammonia. The precipitated bismuth oxide is adsorbed by the iron oxide forming a composite suspension. 4–6 mols of sodium water glass are then added together with a small amount of ammonia. One mol of copper nitrate is dissolved in ammonia to form the dark blue cuprammonium compound and diluted to a 5% solution. Thereupon the solution is poured into the suspension and a little nitric acid is added, care being taken that the mixture as a whole still remains alakaline. The reaction mixture solidifies to a gel which is pressed, washed with water and then with a dilute water glass solution followed by drying. The mass is then broken into fragments and calcined and is an excellent catalyst for the oxidation of ammonia to oxides of nitrogen, which reaction takes place at a low red heat.

Example 14

280 parts of pumice meal impregnated with 2% of nickel in the form of a nitrate is dried, and 3.5–4.5 mols of $SiO_2$ in the form of a water glass solution are mixed with the impregnated pumice with agitation. 0.5 mol $V_2O_5$ is dissolved in alkali and 0.7 mol of iron in the form of iron sulfate is added and is precipitated in the form of iron vanadate and iron oxide. The two suspensions are mixed together and 1 mol of a sodium vanadite solution is poured in in a thin stream. The majority of the excess alkalinity is then neutralized with dilute sulfuric acid and the whole mixture solidifies to a gel which is thoroughly pressed, partially washed with cold water and dried.

This product, which is an alkali vanadyl zeolite containing iron vanadate intimately mixed with pumice meal, nickel oxide and iron oxide and can be used as a catalyst for the oxidation of organic compounds but should be, preferably, subjected to a cautious preliminary treatment with gaseous or very dilute aqueous acids, such as hydrochloric acid, sulfuric acid or phosphoric acid. Blowing with air or ammonium chloride vapors is also very advantageous. The contact mass thus produced is particularly adapted for the catalytic oxidation of anthracene to anthraquinone and of acenaphthene to naphthalic anhydride at 330–420° C., the reaction taking place in the vapor phase with air as the oxidizing agent.

Example 15

260 parts of kieselguhr are formed into a slurry with water and 0.5 mol $V_2O_5$ in the form of a potassium vanadate solution is added and precipitated with a molecularly equivalent amount of copper sulfate solution. Copper vanadate is formed in a very finely divided state throughout the kieselguhr. 3.5–4 mols of $SiO_2$ in the form of a dilute potassium water glass solution are then stirred into the mixture. 1 mol of vanadic acid is reduced in sulfuric acid solution with sulfur dioxide and is then dissolved up with caustic potash to form potassium vanadite as a coffee colored solution. This is then poured into the suspension and a little dilute sulfuric acid is added with vigorous agitation in order to reduce the excess alkalinity. The mixture solidifies to a gel which is then warmed for one-half hour at 70–80° C. a vigorous agitation being maintained in the meanwhile. The product is pressed and washed with water four or five times.

The zeolite produced is an alkali vanadyl zeolite in which kieselguhr impregnated with copper vanadate is embedded. The zeolite is an excellent catalyst for organic oxidations and for this purpose is preferably given a preliminary treatment consisting in calcining the zeolite and then treating with gaseous hydrochloric or sulfuric acid or with very dilute aqueous solutions of the acids.

The catalyst may be used to great advantage in the catalytic oxidation of naphthalene with air in order to produce alpha-naphthaquinone or phthalic anhyride. The products can be produced in excellent yield and of good purity at 350–500° C., the particular product produced depending, of course, on the conditions of the process. The contact mass is extraordinary resistant to high temperatures and is but little effected by long continued use. Other catalytic oxidations, such as methane, ethane and methyl alcohol to formaldehyde, benzol to maleic acid, ethyl alcohol to acetic acid, ethylene chlorhydrine to chlor acetic acid can also be carried out with the catalyst.

The copper vanadate can be substituted partly or wholly by salts of molybdic, tungstic, chromic, tantalic or uranic acid. Products thus produced are excellent catalysts for the oxidation of toluol and its substitution products to benzaldehyde, benzoic acid and the corresponding derivatives.

Example 16

Highly absorptive freshly calcined wood charcoal is stirred into 3–4 mols of $SiO_2$ in the form of a dilute commercial water glass solution until the mixture just remains stirrable. 1 mol of $Al_2O_3$ in the form of sodium aluminate is added and the excess alkalinity is neutralized while vigorous agitation is maintained. A gel is formed which on further stirring becomes granular and is then pressed, dried and hydrated in the usual manner. The product is broken into fragments and if they are not sufficiently firm they can be washed with a dilute water glass solution instead of water.

A permanganate solution can be added to the water glass component to produce a zeolite containing manganese dioxide mixed homogeneously with charcoal. This latter product not only is an excellent water softener and purifier, but it also possesses the important property of removing manganese and iron from water.

In the zeolite molecule aluminum oxide or the oxide or oxides which replace it sometimes clearly plays the part of a base as in the aluminum double silicates and their analogues and sometimes the aluminum oxide or its substitutes form part of a complex anion as in the alumino silicates and their analogues. It is not known whether in the latter case the aluminum oxide plays the part of a base or an acid but for the sake of brevity the expression "non-changeable base," "nuclear base" and the like, will be used in the claims to define aluminum oxide or similar oxides which are present in the nucleus of the zeolite in non-exchangeable form and this expression will be used in contrast to the silicic acid portion of the zeolite nucleus or the acid portion other than silicic acid in the case of substituted zeolites. It should be clearly understood, however, that the use of the term "base" in this connection is not to be taken in its strict or narrow sense of an oxide which is united with an acid and on the contrary, the expression includes aluminum oxides and its substitutes irrespective of the exact chemical combination in which they are present in the zeolite nucleus.

The expression "homogeneous structure" and similar expressions as employed throughout the specification and claims with reference to zeolite bodies embodying the present invention relates to a structure having substantially uniform composition in any given cross section.

What is claimed as new is—

1. Zeolite bodies which include diluent bodies having an average particle size not exceeding 60 microns.

2. Catalyst bodies comprising zeolites and catalytically active diluent bodies united into a homogeneous structure.

3. Catalyst bodies comprising zeolite bodies including a catalytic element and which are catalytically activating to another constituent of the catalyst bodies, all diluent bodies united in a homogeneous structure.

4. Catalyst bodies comprising zeolites and diluent bodies united in a homogeneous structure and containing among the zeolites and diluents at least one catalytically active component and at least one catalytically activating component.

5. Zeolite bodies comprising zeolite and diluent bodies united in a homogeneous structure in which at least part of the diluents are themselves zeolites.

6. Catalyst bodies comprising zeolites and diluent bodies united in a homogeneous structure, at least part of the zeolites containing as catalytically active bases other than aluminum in non-exchangeable form.

7. Catalyst bodies comprising zeolites and diluent bodies united in a homogeneous structure, at least part of the zeolites containing as exchangeable bases other than alkali metals catalytic elements.

8. Catalyst bodies comprising zeolites and diluent bodies united in a homogeneous structure, at least part of the zeolites containing catalytic elements as nuclear acid components other than silicic acid.

9. Zeolite bodies consisting in zeolites and diluent bodies united in a homogeneous structure, at least part of the zeolites being combined with acid groups to form salt-like bodies.

10. Zeolite bodies according to claim 9 in which at least one of the acids is catalytically active.

11. The method of preparing zeolite bodies which comprises causing zeolite forming components to react in the presence of diluent bodies to form a homogeneous structure containing both the zeolites and the diluent bodies.

12. The method of preparing zeolite bodies which comprises introducing into massive diluent bodies zeolite forming components and causing these components to react in contact with the diluent bodies whereby the zeolite is formed in contact with the diluent bodies and in the form of a homogeneous structure.

13. The method of preparing zeolite bodies which comprises causing zeolite forming components to react in the presence of decomposable diluent body compounds to form therewith a homogeneous structure and subsequently decomposing the diluent bodies whereby voids are produced and the porosity of the structure is enhanced.

14. Zeolites containing catalytically active bases other than aluminum in non-exchangeable form and also containing diluent bodies embedded in the zeolite structure, at least part of said diluent bodies being catalysts of different catalytic properties from at least part of the catalytically active bases present in the zeolite in non-exchangeable form.

15. Zeolites containing catalytically active diluent bodies of relatively low melting point embedded in their structure.

16. The method of preparing zeolites containing diluents embedded in their structure which comprises introducing the diluent bodies into at least one of the zeolite components prior to zeolite formation and thereafter causing the zeolite components to react to form a zeolite containing embedded therein the diluent bodies.

17. The method of embedding diluent bodies into zeolite structure which comprises precipitating a zeolite in the form of a gelatinous precipitate and incorporating therein the diluent bodies before the zeolite has hardened.

18. The method according to claim 16 in which at least part of the diluent bodies are in the form of easily decomposable products.

19. The method according to claim 17 in which at least part of the diluent bodies are in the form of easily decomposable products.

20. The method of preparing zeolites containing diluents embedded in their structure which comprises impregnating the zeolites with solutions of diluent bodies and precipitating the diluents by removing the solvents.

21. The method according to claim 16 in which at least part of the diluent bodies are introduced in the form of compounds which are capable of reacting with the zeolite after the latter is formed.

22. The method according to claim 17 in which at least part of the diluent bodies are introduced in the form of compounds which are capable of reacting with the zeolite after the latter is formed.

23. The method according to claim 16 in which at least part of the diluents are added in the form of reducible compounds.

24. The method according to claim 17 in which at least part of the diluents are added in the form of reducible compounds.

25. The method according to claim 16 in which at least part of the diluent bodies are added in the form of reducible products and are reduced by components of the zeolite itself.

26. The method according to claim 17 in which at least part of the diluent bodies are added in the form of reducible products and are reduced by components of the zeolite itself.

27. The method according to claim 16 in which part of the diluent bodies are introduced in the form of reducible compounds which are reduced in situ.

28. The method according to claim 17 in which part of the diluent bodies are introduced in the form of reducible compounds which are reduced in situ.

29. The method according to claim 16 in which diluent bodies are introduced by addition of a soluble compound and reaction of the soluble compound in situ to form the insoluble diluent.

30. The method according to claim 17 in which diluent bodies are introduced by addition of a soluble compound and reaction of the soluble compound in situ to form the insoluble diluent.

31. The method according to claim 16 in which at least part of the diluent bodies are introduced in the form of soluble compounds which are capable of reacting with the zeolite after the latter is formed to produce insoluble compounds.

32. The method according to claim 17 in which at least part of the diluent bodies are introduced in the form of soluble compounds which are capable of reacting with the zeolite after the latter is formed to produce insoluble compounds.

33. The method according to claim 16 in which at least part of the diluent bodies are introduced in the form of soluble compounds which are subsequently rendered insoluble by chemical re-agents other than the zeolite itself or its components.

34. The method according to claim 17 in which at least part of the diluent bodies are introduced in the form of soluble compounds which are subsequently rendered insoluble by chemical re-agents other than the zeolite itself or its components.

35. The method of embedding diluent bodies into the structure of zeolites which comprises impregnating the zeolite with the diluent bodies in a dispersion and precipitating the diluent bodies within the zeolite structure in a relatively nondispersible form.

36. The method according to claim 35 in which at least part of the diluent is introduced in the form of colloidal solutions.

37. The method of embedding diluent bodies in zeolite structure which comprises forming the diluent bodies in the dispersion of at least one of the zeolite components and causing the dispersion so treated to react with re-agents capable of forming therewith a zeolite.

38. The method of forming zeolite bodies which comprises embedding diluent bodies into the structure of a zeolite thus formed with compounds containing acid groups which are capable of reacting with the zeolite to form therewith salt-like bodies.

Signed at St. Louis, Mo., this 13th day of March, 1926.

ALPHONS O. JAEGER.
JOHANN A. BERTSCH.